United States Patent Office 3,551,408
Patented Dec. 29, 1970

3,551,408
TRITERPENE DERIVATIVES, PROCESS FOR PREPARING SAME, AND APPLICATIONS THEREOF
Marguerite Laroche Navarron, Paris, France, assignor to Laboratoires Laroche Navarron, Levallois, France, a French body corporate
No Drawing. Filed June 5, 1967, Ser. No. 643,402
Claims priority, application France, Aug. 8, 1966, 72,364
Int. Cl. C07c 47/18
U.S. Cl. 260—210          4 Claims

ABSTRACT OF THE DISCLOSURE

New triterpene derivatives consisting of an oside of empirical formula $C_{48}H_{78}O_{20}$, named Madecassoside, and of the aglycone thereof formed by a triterpene acid of empirical formula $C_{30}H_{48}O_6$, named Madecassic acid, extracted from the water-alcoholic steep liquors of the plant *Centella asiatica*. They possess therapeutic properties, and particularly a modifying action on the connective tissue.

---

The present invention has for its object new triterpene derivatives endowed with useful therapeutic properties. Said derivatives exhibit, in particular, a modifying action on the connective tissue which is applicable to the treatment of burns and wounds and to the preparation of skin grafts.

Said derivatives are an oside of empirical formula $C_{48}H_{78}O_{20}$, named Madecassoside, and its aglycone consisting of a triterpene acid of empirical formula $C_{30}H_{48}O_6$, named Madecassic acid.

Both these compounds may be extracted from the plant *Centella asiatica* (Linné) Urban.

*Centella asiatica* is a plant listed in the 1884 issue of the French Codex.

The genus Centella belongs to the tribe of hydrocotyles and to the family Umbelliferae. This pantropical species exhibits geographical forms each of which has a particular biochemical composition.

The preferred form according to the invention is that growing in Madagascar.

Madecassoside and Madecassic acid may be produced by extraction from the water-alcoholic steep liquor of *Centella asiastica*.

The presence of Asiatic acid and of Asiaticoside has already been demonstrated in this steep liquor, as described in French patent (special patent on medicine) No. 884 M.

Madecassoside and Madecassic acid were discovered in the extraction residue of the foregoing compounds, and are thus prepared as follows:

The water-alcoholic steep liquor of *Centella asiatica* is concentrated, resulting in the crystallization of Asiatic acid end of Asiaticoside. The mother-liquors obtained after filtration of both these compounds contain the Madecassoside, a small amount of Madecassic acid and a residual portion of Asiaticoside. They are again concentrated and crude Madecassoside is thereby produced. The latter may then be hydrolyzed to give Madecassic acid.

Thus, the invention has also for its object a process for the preparation of Madecassoside and of Madecassic acid, comprising submitting a water-alcoholic steep liquor of the plant *Centella asiatica* to a concentration step, removing the products which crystallize during such concentration and evaporating to dryness the residual steep liquor, thereby obtaining the crude Madecassoside which is then hydrolyzed to give Madecassic acid.

The following example illustrates the preparation of crude Madecassoside.

EXAMPLE 1

50 litres of mother-liquors from the preparation of Asiatic acid+Asiaticoside are concentrated under reduced pressure until a pasty mass is obtained (45 litres of water must thus be evaporated).

The resulting paste is then desiccated in a vacuum oven until a solid mass weighing about 5 kg. and constituting the crude Madecassoside is obtained.

A more purified although still crude Madecassoside may be obtained by percolating the crystallization mother-liquors of Asiatic acid and of Asiaticoside through cationic and anionic exchangers, for the purpose of removing the organic acids present.

After concentration of the precolated liquor, the concentrated liquor is extracted with an alcohol, such as butanol, which solubilizes the Madecassoside and the Asiaticoside.

The butanol solution is evaporated to dryness, the residue is taken up in hot water, the major portion of the Asiaticoside crystallizes on cooling, the latter is filtered and the crude Madecassoside is evaporated to dryness.

To obtain a pure product from the crude Madecassoside, fractional crystallization may be carried out according to the following example:

EXAMPLE 2

(1) Crude Madecassoside (30 g.) is solubilized in 200 ml. of 95% ethyl alcohol heated to boiling.

After cooling, 200 ml. of ethyl acetate are added, and the mixture is allowed to rest during 24 hours.

The product which crystallizes out is suction filtered and dried, to give 15 g. of a product analyzing (by chromatography) 90% of Madescassoside.

(2) When repeating step (1), i.e., when solubilizing 15 g. of this already purified material in 100 ml. of 90% alcohol, followed by precipitation by addition of ethyl acetate, there are obtained 10 g. of chromatographically pure Madecassoside.

As a modification, fractionation of the crude Madecassoside may be effected over silica gel with a butanol-water mixture, resulting in the isolation of a fraction comprising solely the Madecassoside. The pure product is obtained on concentration of this fraction.

Madecassic acid being present only in small amounts in the steep liqours, its direct extraction is difficult. Thus, to obtain this material, it is preferred to effect hydrolysis in the hot of the Madecassoside in aqueous acidic solution.

The following example illustrates this preparation:

EXAMPLE 3

Fifty grams of Madecassoside are solubilized in 200 ml. of water, and are then heated 1 hour in the water-bath after addition of 100 ml. of concentrated hydrochloric acid.

After a few minutes, the solution becomes cloudy and an increasingly abundant deposit precipitates out.

After cooling, the precipitate is suction filtered, washed with water and dried.

There are obtained 23 g. of Madecassic acid.

From a chemical standpoint, the Madecassoside and Madecassic acid may be characterized as follows:

(a) Madecassoside

This material, of empirical formula $C_{48}H_{78}O_{20}$ includes:
(1) a triterpene portion which is Madecassic acid (comprising 47% by weight of the total material);
(2) an ose portion, formed by one molecule of rhamnose and two molecules of glucose (the latter two being linked together in the same fashion as in gentiobiose).

(b) Madecassic acid

This is the aglycone of the above material, a triterpene acid of formula $C_{30}H_{48}O_6$ having an ethylene bond and hydroxyl groupings.

Other physical-chemical characteristics of both these componds are summarized in the table below:

TABLE

|  | Madecassoside | Madecassic acid |
|---|---|---|
| a) Organoleptic character. | White powder, slightly bitter taste. | White powder, sweetish taste. |
| b) Solubility | Highly water-soluble 300 g./l. Soluble in ethyl alcohol, butyl alcohol, pyridine, acetic acid. | Water-insoluble, soluble in dilute sodium hydroxyde. Soluble in ethyl alcohol, butyl alcohol, pyridine, acetic acid. |
| c) Specific optical rotation. | $[\alpha]_D^{20} = -19°$ (c.=2.2%, water) | $[\alpha]_D^{20} = +31°$ (c.=1.5%; methanol). |
| d) Melting point | Pasty melt at about 220° C. | 265–268° C. |

The best method for the identification of Madecassoside and of Madecassic acid, which in addition, permits to differentiate these materials from the accompanying compounds in *Centella Asiatica*, is thin layer (0.3 mm. thickness) chromatography over Silicagel G (Merck). The chromatoplates are prepared in the conventional manner. The product to be chromatographed is dropped at a distance of 1.5 cm. from the lower edge by means of a micropipette. These plates are introduced in a development jar to which the solvent has been added to a height of about 0.5 cm. In this case, the solvent comprises a mixture, in the following ratios:

|  | Vol. |
|---|---|
| Butanol | 60 |
| Ethyl acetate | 40 |
| Ammonia | 10 |
| Water | 5 |

When the front of the solvent has travelled about 12 cm., the plate is removed and is allowed to dry.

A mixture of acetic anhydride (9 parts) and concentrated sulfuric acid (1 part) is then sprayed.

This plate is then placed during a few minutes in an oven (110° C.) and the separated materials appear with different Rƒ values and colours.

|  | Rƒ (approximate) | Colour of the spots |
|---|---|---|
| Madecassoside | 0.06 | Violet. |
| Asiaticoside | 0.1 | Green-blue. |
| Madecassic acid | 0.27 | Mauve. |
| Asiatic acid | 0.43 | Green-blue. |

The pharmacological investigations effected with Madecassoside and Madecassic acid resulted in the following data:

(I) TOXICITY INVESTIGATION

1°—Acute toxicity of Madecassoside in mice and rats.
—In mice:

(a) Oral route

A preliminary test effected with two groups of 30 mice, at the 5 following doses: 5, 3, 1, 0.5 and 0.1 g./kg. having had no lethal effects, the final test was effected with the two higher dosages of 5 g./kg. and 3 g./kg.

The test was conducted using 2 homogeneous lots of 20 male and female mice, of same origin, of 20 g. average weight (18–21 g.), fed a standard diet. The animals were placed under observation 8 days prior to the experiment, and were left fasting the day before administration.

The product, dissolved in distilled water, was administered to the animals under a uniform volume of 0.25 ml./20 g., by individual forcible feeding by means of a probang.

The mice were kept at laboratory temperature (24°) and were then placed under observation and weighed during 14 days.

Results

|  | Number of animals | | Death rate | Percent |
|---|---|---|---|---|
|  | Male | Female | | |
| Dosage: | | | | |
| 5 g./kg. | 10 | 10 | 0/20 | 0 |
| 3 g./kg. | 10 | 10 | 0/20 | 0 |

Weight increase was normal.

(b) Subcutaneous route

The preliminary test having been conducted as previously described, the final test was effected with 2 homogeneous lots of 20 male and female mice left fasting the day prior to the injection.

The product, dissolved in physiological saline solution, was administered subcutaneously, under a uniform volume of 0.25 ml./20 g.

Results

|  | Number of animals | | Death rate | Percent |
|---|---|---|---|---|
|  | Male | Female | | |
| Dosage: | | | | |
| 3 g./kg. | 10 | 10 | 0/20 | 0 |
| 5 g./kg. | 10 | 10 | 0/20 | 0 |

Weight increase was normal.

To conclude, acute toxicity of the Madecassoside was zero for male and female mice weighing 20 g., up to a dosage of 5 g./kg., both per os and subcutaneously.

—In rat:

(a) Oral route

The test was conducted under the same operating conditions as the test with mice, using 2 homogeneous lots of 20 white rats, both male and female, having an average weight of 120 g.

The product was dissolved in water and administered under a uniform volume of 2 ml./100 g. by individual forcible feeding with a probang.

Results

|  | Number of animals | | Death rate | Percent |
|---|---|---|---|---|
|  | Male | Female | | |
| Dosage: | | | | |
| 3 g./kg. | 10 | 10 | 0/20 | 0 |
| 5 g./kg. | 10 | 10 | 0/20 | 0 |

The animals, kept at laboratory temperature (24°) and put under observation during 8 days, exhibited normal weight increase.

(b) Subcutaneous route

The test was effected according to the same procedure, using 2 homogeneous lots of white male and female rats, having an average weight of 120 g.

The product was dissolved in physiological saline solution and administered under a uniform volume of 2 ml./100 g., subcutaneously.

Results

| | Number of animals | | Death rate | Percent |
|---|---|---|---|---|
| | Male | Female | | |
| Dosage: | | | | |
| 3 g./kg | 10 | 10 | 0/20 | 0 |
| 5 g./kg | 10 | 10 | 0/20 | 0 |

The rats were put under observation during 14 days at laboratory temperature, and weighed regularly.

The growth curve was normal. No deaths were noted.

To conclude, the acute toxicity of Madecassoside was zero up to a dosage of 5 g./kg. both per os and by the subcutaneous route in male and female rats having an average weight of 120 g.

2°—Acute toxicity of Madecassic acid in rat.

The toxicity tests were effected in a manner similar to that described above for Madecassoside and resulted in the same conclusion.

In both cases, due to the very low toxicity of the products, the $LD_{50}$ could not be determined, and could not even be approximated.

3°—Long term chronic toxicity of Madecassic acid and of Madecassoside, in rat.

This investigation was effected concomitantly with each of the two products, according to the same testing procedure.

Testing was carried out with 5 homogeneous lots of 10 male and 25 female adult Wistar rats weighing about 75 g. of same origin, kept under observation in the laboratory during 15 days prior to the test.

Thus, the test was effected with 50 males and 125 females. During the 6 months of the test, the animals were given ad libitum water and standard food. This diet was enriched with the weekly adjunct of vitamin $B_{12}$ and of cod liver oil.

Five male lots and five female lots were constituted:
—one of the lots serving as reference and receiving a 5% gum aqueous solution,
—two lots receiving the product by the oral route,
—two lots receiving the product by the parenteral route (subcutaneously).

For administration by the oral route, the Madecassic acid was suspended in a 5% gum aqueous solution, and the Madecassoside was dissolved in distilled water.

The following dosages were selected for this route:

Mg./kg.
Body weight for one of the lots _____ 5
Body weight for the second lot _____ 25

For administration by the subcutaneous routes, the Madecassic acid was suspended and the Madecassoside was dissolved in a same vehicle, physiological saline solution.

The following dosages were selected for this route:

Mg./kg.
For one of the lots _____ 10
For the other lot _____ 50

The entire experiment was conducted at laboratory temperature (20–25°).

Throughout the test, the behavior of the animals was observed, and the animals were weighed twice weekly during the first three months, and once weekly during the last three months.

At the conclusion of the test, two males and two females from each lot were sacrificed and the main organs were removed for purposes of histological investigation (the remaining animals were mated).

The results were as follows:

No change in the behavior of the animals was noted during the experimental period: neither aggressiveness, nor sleepiness. The animals retained normal motor activity.

No deaths were observed in any of the lots during the testing period: survival was general.

Examination of the weight curves: the aspect of the curves obtained is typical of a growth curve; they exhibit a first phase of rapid growth followed by a slightly ascending level stretch during which growth is considerably slowed down.

The weight increase curves are practically superimposable in each lot. The growth of the treated lots, both by the oral and by the subcutaneous route, follows that of the reference animals throughout the testing period, both in males and in females.

Histology: examination of principal organs showed neither lesion, nor anomaly.

To conclude, Madecassic acid and Madecassoside are perfectly well tolerated by the Wistar rat treated during 6 months. At the conclusion of the test, no mortality is noted. Histology of the main organs is normal.

No abscess or eschar were noted at the inoculation point in any of the male or female rats that were given the product subcutaneously.

The animals exhibited perfect tolerance for each of the two products, at the four dosages tested and by both routes of administration. This test takes its full value when it is considered that the dosages used in this test are rather considerable and that a 6 month treatment in rat is equivalent to 5 years of the same treatment in man.

(II) INVESTIGATION OF THE THERAPEUTIC ACTIVITY

1°—Testing the cicatrizing activity of Madecassoside and Madecassic acid.

(a) On experimental cutaneous wounds

The test was conducted in parallel fashion with each of the two products, and according to the same procedure.

Two lots of young male rats, weighing about 70 g., were distributed individually in cages. After shaving off the hair of the back, a semi-circular surface of skin having a diameter of about 2 cm. is taken from each rat, by means of scissors, from the mean lumbar area.

A tracing of the surface of the wound is obtained by means of transparent paper, and is then transferred onto homogeneous Bristol paper weighing 40 mg. per square centimetre which is then cut according to the contour of the wound and is then weighed. Since the resulting weight is proportional to the surface under consideration, the results are expressed according to such data.

During the 11 days of the experiment, the rats are given water and balanced diet, ad libitum. They are weighed regularly.

The animals are given daily injections, under a uniform volume of 0.5 ml. per 100 g. of body weight, by the subcutaneous route, under the skin of the abdomen, from the day the wounds were effected, the injections being as follows, for reference animals and treated animals:

Reference animals:
  10° water-alcoholic solution for Madecassic acid
  Physiological saline solution for Madecassoside.

Test animals:
  Madecassic acid at 2 g./ml. in a 10° water-alcoholic solute, i.e., 10 mg./kg.,
  Aqueous Madecassoside solution at 2 mg./ml., i.e., 10 mg./kg.

Daily examination of the animals shows that the wounds of the rats given the Madecassoside and Madecassic acid are redder, and that vascularization seems to develop more rapidly therein.

The cicatrization tissue progresses more rapidly in the treated animals.

It results from this test that Madecassoside and Madecassic acid at the dosage of 10 mg./kg./day accelerate significantly the healing of surface wounds in rat.
(b) on experimental burns of the cornea, in rabbit.

Male rabbits, weighing about 1 kg., of same origin, fed a balanced diet, are given, after local novocain anesthesia of the eye, a corneal burn of known surface and intensity. This burn induces in all animals an intense local reaction, with redness of the cornea, palpebral oedema and general hypervascularization.

As early as the second day, an opaque plaque is noted at the level of the traumatized area, in the untreated reference animals. Generally, this opacity becomes permanent. In the rare cases where it regresses spontaneously, it does so, in any event, only after a period of at least one month.

In the rabbits which were given 1 mg. of Madecassic acid or of Madecassoside subcutaneously, immediately after the burn, and then every other day, corneal healing, controlled by instillation of fluorescein, was complete on the 10th day. The recovered transparency is complete.

2°—Anti-inflammatory properties:

The anti-inflammatory capacity of Madecassoside and of Madecassic acid was tested by the kaolin-induced oedema method.

PRINCIPLE

In rat, the intra-plantar injection of a determined volume of kaolin suspension, in one of the rear paws, produces an oedema the intensity of which is evaluated, after section of both rear paws, by the difference in weight between the reference paw and the paw which has been given the kaolin.

The effect of the administration of both test products on the evolution of this oedema is investigated.

This investigation is carried out each time with homogeneous lots of 30 male Wistar rats, having an average weight of 120 g., kept under laboratory supervision 8 days prior to testing, and given ad libitum water and standard food.

The first lot is used as reference lot, the second lot is given a reference anti-inflammatory material, and the last two lots are given the Madecassoside and Madecassic acid, respectively.

A 10% kaolin suspension in distilled water is prepared, and this is administered in intra-plantar injection, under a uniform volume of 0.1 ml. per rat, in one of the rear paws.

Treatment is effected twice the day prior to testing (24 and 17 hours prior to administration of the kaolin), and once on the day of the test (one hour prior to administration of the kaolin).

Thus, the first lot receives 3 injections of physiological saline solution,

The second lot receives a cortisone acetate suspension at a dosage of 20 mg./kg., The third lot receives a suspension of Madecassic acid in distilled water, at dosages of 75 mg./kg. to 2 g./kg., The fourth lot receives a solution of Madecassoside at the same dosage.

Each injection is given subcutaneously, at a uniform volume of 0.5 ml./100 g. of body weight.

Five hours after the kaolin injection, the animals are anesthetized with ether, both rear paws are cut off at the level of the tibio-metatarsal joint, and are weighed.

The degree of inflammation is assessed, for each rat, by the difference in the weight of both paws. The mean value of the differences is then established for each lot, and the percent protection is calculated.

The anti-inflammatory capacity of the Madecassoside and Madecassic acid is effective, under the aforesaid experimental conditions, only at a threshold dosage of 250 mg./kg., subcutaneously; the degree of protection obtained with cortisone used at a dosage of 20 mg./kg. varied, depending on the tests, within 13 to 20%. Analogous protection is obtained with the Madecassoside and Madecassic acid at dosages of from 300 to 500 mg./kg.

It is apparent, from the above data, that the Madecassoside and Madecassic acid are connective-tissue modifiers.

They promote nitrogen retention and collagen synthesis. In this respect, they are useful in:

the treatment of burns, of atonic wounds, of obstinate ulcers generally, and of corneal ulcers, particularly of collagen diseases, and of leprelcosis, the preparation of skin grafts.

Hence follow the therapeutic indications of both derivatives according to the invention which may, for this purpose, be formulated as therapeutic compositions for administration by the oral, parenteral or topical route, the active principle being associated with the vehicles and excipients suitable for these various routes of administration. Thus, inter alia, suitable therapeutic compositions are tablets, injectable solutes, powders, ointments and collyria. Illustrative examples of such compositions are given below.

| | Average dose | Strong dose |
|---|---|---|
| 1. Tablets | | |
| Example of formulation: | | |
| Medecassic acid or Madecassoside mg | 1 | 5 |
| Excipient (as illustrative example) g.: | | |
| Starch | | |
| Alumina hydrate | | |
| Potato starch | | |
| Calcium carbonate | 0.20 | 0.20 |
| Gum arabic | | |
| Magnesium stearate | | |
| Q.s. for 1 tablet finished at | | |
| 2. Solute (subcutaneous and intramuscluar routes): | | |
| a) Madecassoside, mg | 10 | 20 |
| ClNa q.s. to | Isotonia | |
| Purified pyrogen-free water, q.s., ml | 1 | 1 |
| b) Madecassic acid, mg | 10 | 20 |
| Polysorbate 80, g | 0.0002 | 0.0002 |
| Sodium chloride, g | 0.009 | 0.009 |
| Purified pyrogen-free water, q,s., ml | 1 | 1 |
| 3. Powder for external use: | | |
| Madecassoside or Madecassic acid, g | 1 | 2 |
| Excipient: | | |
| Talc, g | 49.5 | 49 |
| Magnesium sterarate, g | 49.5 | 49 |
| Total | 100 | 100 |
| 4. Ointment | | |
| Madecassoside or Madecassic acid, g | 0.5 | 1 |
| Maize oil, g | 10 | 10 |
| Glycol stearate, g | 20 | 20 |
| Propylene glycol, g | 25 | 25 |
| Lavender oil, ml | 0.143 | 0.143 |
| Geranium oil, ml | 0.143 | 0.143 |
| Distilled water, q.s. to make, g | 100 | 100 |
| 5. Collyrium | | |
| a) Madecassic acid, mg | 15 | 30 |
| Benzyl alcohol, mg | 9 | 9 |
| Sodium carboxymethylcellulose, mg | 15 | 15 |
| ClNa q.s. to | Isotonia | |
| Polysorbate | 3 | 3 |
| Sterile distilled water ml | | |
| b) Madecassoside, mg | 15 | 30 |
| ClNa q.s. to | Isotonia | |
| Preservatives, q.s. | 3 | 3 |
| Sterile distilled water, q.s., ml | | |

The following is a suitable average dosage regimen for these various forms:

(1) Tablets at 1 mg.: 4 tablets daily in maintenance treatments,

Tablets at 5 mg.: 4 tablets daily at the start of the treatment.

(2) Injectable solute: 10–20 mg. daily injection, then every other day.

(3) Ointment and powder: daily local applications, following the rhythm of the dressings.

(4) Collyrium: 1–2 drops in the diseased eye, twice daily.

Having now described my invention what I claim as new and desire to secure by Letters Patent is:

1. New triterpene derivatives consisting of an oside of empirical formula $C_{48}H_{78}O_{20}$, named Madecassoside, having a specific optical rotation $[\alpha]_D^{20}$ of $-19°$ (c.=2.2%, water) and giving a pasty melt at about 220° C.

2. New derivative as claimed in claim 1, having a Rf value of 0.06 on chromatography over silical gel by means of a solvent comprised of a mixture of 60 volumes of butanol, 40 volumes of ethyl acetate, 10 volumes of ammonia and 15 volumes of water.

3. A triterpenic acid of the empirical formula $C_{30}H_{48}O_6$ which is the aglycone of Madecassoside and has a specific optical rotation $[\alpha]_D^{20}$ of $+31°$ (c.=1.5% methanol) and a melting point of 265–268° C.

4. A triterpenic acid as claimed in claim 3 having a Rƒ value of 0.27 on chromatography over silical gel by means of a solvent comprised of a mixture of 60 volumes of butanol, 40 volumes of ethyl acetate, 10 volumes of ammonia and 15 volumes of water.

References Cited

Bhattacharyya(I) "Chem. Abst." vol. 51, 1957, p. 4551(e).

Bhattacharyya(II) "Chem. Abst." vol. 51, 1957, p. 8700(a).

LEWIS GOTTS, Primary Examiner

J. R. BROWN, Assistant Examiner

U.S. Cl. X.R.

260—514; 424—180